Nov. 3, 1964  K. A. RASMUSSEN  3,155,366
DIAPHRAGM VALVE
Filed March 15, 1962  2 Sheets-Sheet 1
FIG. IA
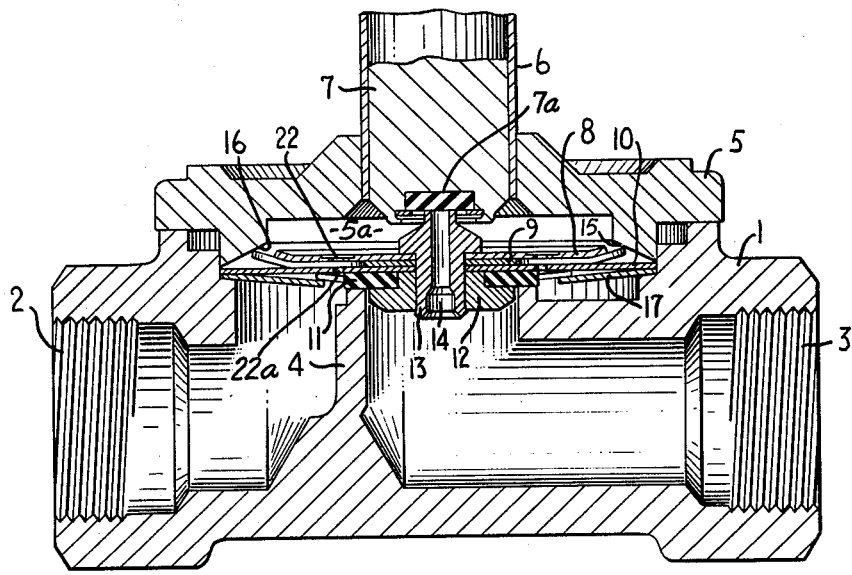
FIG. IB
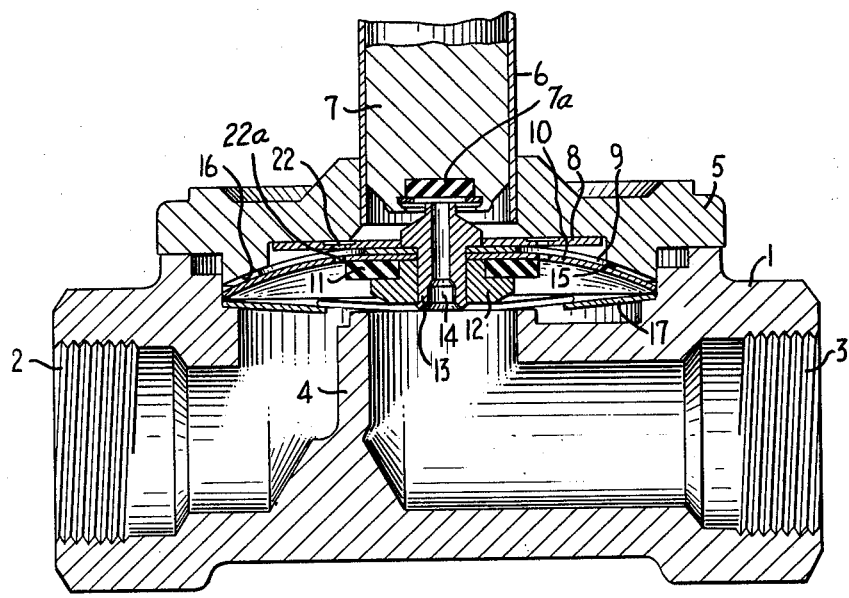

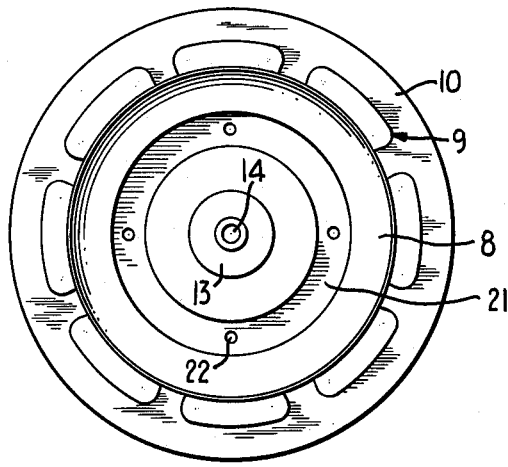
FIG. 2
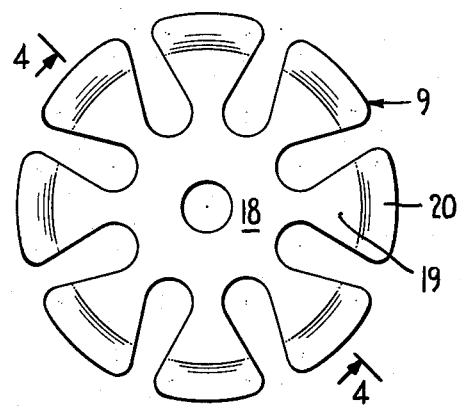
FIG. 3
FIG. 4
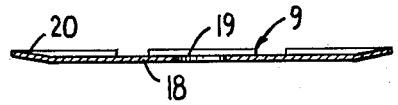

United States Patent Office 3,155,366
Patented Nov. 3, 1964

3,155,366
DIAPHRAGM VALVE
Knud Alfred Rasmussen, Sonderborg, Denmark, assignor to Danfoss ved Ing. M. Clausen, Nordborg, Denmark, a company of Denmark
Filed Mar. 15, 1962, Ser. No. 179,944
Claims priority, application Germany, Mar. 16, 1961
D 35,669
7 Claims. (Cl. 251—45)

This invention relates to diaphragm valves and is more particularly concerned with diaphragm valves of the type having a flexible diaphragm movable toward and away from a closed rest position to a deflected open position.

It is well known that contradictory demands are made upon the diaphragm in a diaphragm valve. Thus, it is desired that the diaphragm be as soft or flexible and sensitive as possible in order to permit it to adapt or respond to prevailing conditions such that only very slight controlling forces will be sufficient to direct it from a rest or closed position to an open position. On the other hand, it is desired that the diaphragm be as stiff as possible in order that it will not be pulled out of its track or seat and in order that it will not be adversely deformed during the continued influence of the controlling forces.

Obviously, such contradictory requirements pose a serious problem in the construction of diaphragm valves and efforts to provide a valve which satisfies these two requirements to a substantial extent have not been entirely successful.

It is accordingly an object of the present invention to provide an improved diaphragm valve which effectively combines features of stiffness and flexibility and substantially meets the foregoing criteria.

According to the invention, this and other objects are met by a diaphragm valve construction in which the diaphragm member is combined with and cooperates with a resilient element which permits the diaphragm to deflect when required but at the same time stiffens the diaphragm when required.

It is a feature of the invention that the resilient element imparts sufficient rigidity to the diaphragm at those moments in which an excess loading begins to act upon the diaphragm. Thus, a relatively soft and flexible diaphragm can be utilized without fear that it will be pulled away from its track or seat or that it will be influenced by a steady deformation. The resilient element also assists in the return movement of the diaphragm to its rest position, thus effecting a more rapid closing of the valve.

The resilient element is preferably so constructed that the diaphragm is relieved of its action when the diaphragm is in its rest position. In this manner the starting movement of the diaphragm is not hindered by any oppositely-directed action of the resilient element. The diaphragm valve thus reacts sensitively even to slight controlling forces.

In order to provide as flat a construction as possible, the resilient element suitably consists of a plate firmly secured against the diaphragm and provided with outwardly-extending arms, the extremities of which engage a supporting surface provided in the valve housing. As soon as the resilient arms bear fully against the supporting surface during their deflection movement, they relieve the diaphragm. Moreover, the extremities of the arms are advantageously bent away from the diaphragm and thus bear against the supporting surface constantly, but the diaphragm will remain free of load when in its rest position.

The construction of the invention is particularly advantageous when used with a free-floating diaphragm, i.e. a diaphragm which is not secured along its periphery but which has its periphery freely seated in a circular groove having an inclined shoulder, the shoulder simultaneously acting as the supporting surface for the resilient arms.

The invention is very effectively embodied in a diaphragm valve construction in which a pilot port or orifice is disposed in the center of a body which cooperates with a strengthening ring and a supporting plate between which the diaphragm and the resilient element are sandwiched. A particularly effective construction is provided when the resilient element with its resilient arms is disposed between the diaphragm and the supporting plate.

In addition, an elastic element serving as a valve disc can be placed between the diaphragm and the strengthening plate in the aforementioned embodiment. The elastic element assists the action of the resilient element in that it creates a stiffening in an opposite direction upon the center of the diaphragm.

Furthermore, an elastic element of the character indicated which also forms the valve disc is of practical importance for a diaphragm valve because, by utilizing it, the diaphragm material can be selected independently of its sealing properties. For example, the elastic element may consist of a rather pliable and soft rubbery material which will effectively seal against the valve seat, whereas the diaphragm may consist of a less pliable material. The diaphragm and the resilient element can also be formed from different materials when other properties are of importance, e.g. acid resistance, and the like.

Further characteristics of the invention will be apparent from the following detailed description of an illustrative embodiment thereof, taken in connection with the accompanying drawings wherein, FIG. 1A is a longitudinal sectional view, of a diaphragm valve embodying features of the invention, showing the valve in its closed position and FIG. 1B is a similar view showing the valve in its open position;

FIG. 2 is a bottom view of the movable parts of the valve, showing them as they appear from below;

FIG. 3 is a top plan view of the resilient element; and

FIG. 4 is a sectional view of the resilient element, taken along a diameter across the center of FIG. 3.

Referring to the drawings, and more particularly to FIGS. 1A and 1B, the housing 1 is provided with an inlet 2, an outlet 3, and an intermediate valve seat defined by the wall 4 and the associated parts of the body 1. The cover or cap 5 cooperates with the housing 1 to form the body of the valve and provides a control-pressure chamber 5a. The cover 5 contains the sheath 6 for the valve stem 7 in conventional manner, the valve stem being adapted to be operated manually, by means of an electromagnet, or by means of a hydraulic servomotor. The foregoing parts of the valve can be of conventional construction and form no part of the present invention.

The movable parts of the valve comprise the supporting plate 8, the resilient element 9, the diaphragm 10, the elastic ring 11 which acts as a valve disc for engagement with the valve seat, and a strengthening ring 12. All of these parts are firmly mounted upon a body 13 containing an axial pilot port or orifice 14 adapted to be closed when the valve is in closed condition by the valve disc 7a carried by the lower end of valve stem 7. The diaphragm 10 is free floating, and it will be seen that it is not secured and held along its periphery and its peripheral portion is freely seated in a circular groove 15 formed by the housing 1 and by the cover 5. The upper surface of the circular groove is defined by an inclined shoulder 16. In addition, a rigid arrester ring 17, which prevents a too great deflection of the diaphragm, when in its rest position, is disposed in the circular groove 15.

As shown in FIG. 3, the resilient element 9 consists of a plate 18 provided with outwardly-extending resilient arms 19. The extremities 20 of the arms 19 are deflected slightly away from the surface plane of the plate so that they provide a flange or rim for the plate in circumferentially spaced-apart sections. These flanged extremities 20 are dimensioned so that they extend into the circular groove 15, in which they remain even when the diaphragm is in its rest position, as seen in FIG. 1A. When the diaphragm is in its rest position shown in FIG. 1A, the resilient element does not act upon or influence it. As soon as the diaphragm deflects, however, the arms 19 are supported by the shoulder 16, but since the extremities 20 are flanged and flex as seen in FIG. 1B, the diaphragm has to move a certain distance before the relieving action of the resilient element is noticed. However, the more the diaphragm is deflected, the more the resilient arms 19 are deformed. The most powerful relieving action of the resilient arms 19 occurs at the maximum deflection, i.e. at that moment which is the most dangerous from the standpoint of permanent deformation of the diaphragm.

In order to prevent the resilient arms 19 from hindering a short circuit through the diaphragm provided by bleed apertures 22a in the diaphragm in known manner, a groove 21 is suitably provided in the supporting plate 8, with holes 22 being positioned in the groove so that it does not matter if the holes 22 directly overlie one of the resilient arms.

As previously indicated, the construction of the present invention is adapted to be incorporated with conventional parts of a conventional type of diaphragm valve. In this connection reference is made for example to Vargo U.S. Patent 2,870,986 which shows a typical diaphragm valve of the type with which the construction of the present invention is employed. This patent shows, for example, an electromagnetically-actuated valve stem. In this patent, the flexible disc 44 corresponds to the diaphragm 10 of the present construction and the plate 40 of the patent generally corresponds to the supporting plate 8.

In the de-energized position of the solenoid valve, the diaphragm assembly made up of elements 8, 9, 10, 11, 12 and 13, is held between the bottom of valve stem 7 and the valve seat defined by wall 4, as shown in FIG. 1A. In this position the pilot port 14 is closed by the valve disc 7a while the inlet 2 (which is at greater pressure than the outlet passage 3) communicates with the chamber 5a above the diaphragm assembly through the usual bleed passages 22a through the diaphragm 10 and holes 22 in supporting plate 8, as indicated above. When the diaphragm is in its rest position shown in FIG. 1A, the resilient element does not act upon or influence it.

When the solenoid is energized, the valve stem 7 moves upwardly, freeing the diaphragm assembly (FIG. 1B). Simultaneously, the chamber 5a above the diaphragm assembly is placed in direct communication with the outlet 3 through the pilot-port 14. Because the cross-sectional area of the pilot-port 14 is larger than the cross-sectional area of the liquid passage through the diaphragm assembly, the pressure in chamber 5a above the diaphragm assembly is exhausted to the outlet 3 through the pilot-port 14. This sudden decrease in pressure above the diaphragm assembly occurs faster than the fluid force can be supplied from the inlet 2. Therefore, the reduced pressure above the diaphragm assembly causes the member to rise. As indicated above, as soon as the diaphragm deflects, the arms 19 are supported by the shoulder 16, but since the extremities 20 are flanged and flex, as seen in FIG. 1B, the diaphragm has to move a certain distance before the relieving action of the resilient element is noticed. In other words, the diaphragm has a limited lost motion. However, the more the diaphragm is deflected, the more it is supported by the resilient arms 19, which are accordingly resiliently deformed.

It will be understood, however, that various changes may be made in the embodiment described and illustrated without departing from the invention as defined in the appended claims. For example, the invention can be embodied in a valve having a peripherally-secured diaphragm. The presence of the pilot port or orifice is not essential to the invention. The resilient element can also have other forms, e.g. it may be in the form of a helical spring bearing against the cover 5. It is intended, therefore, that all matter contained in the foregoing description and in the accompanying drawings shall be interpreted as illustrative only and not as limitative of the invention.

I claim:

1. An electromagnetic diaphragm valve comprising a hollow valve body having a valve outlet, a central valve seat leading to said valve outlet, a vale inlet and a chamber surrounding and communicating with said seat and with said valve inlet and formed with a circular peripheral groove surrounding said valve seat and having an inclined shoulder, a diaphragm assembly disposed in said chamber for movement toward and away from said seat to control communication between the inlet and outlet, a bleed passage for admitting control pressure to said chamber to bias the diaphragm to the valve seat, said diaphragm assembly comprising a flexible diaphragm member, a resilient element disposed in overlying relationship with respect to said diaphragm member, and a central pilot-port-forming unit interconnecting said flexible diaphragm member and said resilient element and providing an axial passage through said diaphragm member and said resilient element, and valve operating means including a valve member to control the flow through said pilot-port-forming unit, said diaphragm member having a peripheral portion extending into said groove in free-floating relationship, said resilient element having peripheral portions received in said groove in spaced relationship, whereby said resilient element does not bias said diaphragm member when it is sealed on said valve seat, said peripheral portions of said resilient element being engageable with said inclined shoulder upon predetermined movement of said diaphragm member from said valve seat to relieve the diaphragm to a progressively increasing amount as said diaphragm member moves away from said valve seat, said resilient element supporting substantially the entire diaphragm member when said diaphragm member is in fully deflected position while retaining the peripheral portion of said diaphragm member in said groove.

2. A diaphragm valve as defined in claim 1, wherein the resilient element is in rest position when the diaphragm is in its rest position.

3. A diaphragm valve as defined in claim 2, wherein the resilient element comprises a plate firmly secured to the diaphragm and provided with outwardly-extending arms.

4. A diaphragm valve as defined in claim 3, wherein the extremities of the arms are bent away from the diaphragm.

5. A diaphragm valve as defined in claim 4, wherein the extremities of the arms are bent away from the diaphragm.

6. A diaphragm valve as defined in claim 1, wherein the resilient element comprises a plate firmly secured to the diaphragm and provided with outwardly-extending arms.

7. A diaphragm valve as defined in claim 1, wherein said assembly further comprises an elastic element forming a valve disc and disposed to engage said valve seat when the diaphragm moves into its rest position.

References Cited by the Examiner
UNITED STATES PATENTS

| | | | |
|---|---|---|---|
| 1,826,648 | 10/31 | Bragg | 137—613 XR |
| 2,870,986 | 1/59 | Vargo | 251—45 |
| 2,938,703 | 5/60 | Dietz | 251—129 |
| 3,021,792 | 2/62 | Johnson | 137—743 XR |

ISADOR WEIL, *Primary Examiner.*
MARTIN P. SCHWADRON, *Examiner.*